United States Patent [19]

King

[11] Patent Number: 4,748,825
[45] Date of Patent: Jun. 7, 1988

[54] BUS AIR CONDITIONING UNIT

[75] Inventor: Donald D. King, Chanhassen, Minn.

[73] Assignee: Thermo King Corporation, Minneapolis, Minn.

[21] Appl. No.: 114,317

[22] Filed: Oct. 29, 1987

[51] Int. Cl.⁴ .............................................. B60H 1/32
[52] U.S. Cl. ...................................... 62/244; 62/298; 62/DIG. 16
[58] Field of Search ............... 62/244, 298, DIG. 16, 62/259.1

[56] References Cited

U.S. PATENT DOCUMENTS

| | | | |
|---|---|---|---|
| 2,054,350 | 9/1936 | Weiland | 62/244 |
| 2,123,076 | 7/1938 | Madden | 62/244 |
| 2,182,569 | 12/1939 | Peo | 62/244 |
| 2,185,034 | 12/1939 | Melcher | 62/244 |
| 2,320,596 | 6/1943 | Henney | 62/244 |
| 2,443,472 | 6/1948 | Mayo et al. | 62/244 |
| 2,552,819 | 5/1951 | Schywarzmayr | 62/244 |
| 2,696,084 | 12/1954 | Kirkpatrick | 62/244 |
| 2,774,227 | 12/1956 | Schjolin et al. | 62/244 |
| 2,799,143 | 7/1957 | Weigel | 62/259.1 X |
| 2,891,389 | 6/1959 | Tull | 62/298 |
| 3,173,274 | 3/1965 | Dean | 62/244 |
| 3,173,275 | 3/1965 | Urian | 62/244 |
| 3,218,821 | 11/1965 | Spatt | 62/244 |
| 3,315,488 | 4/1967 | Lind | 62/259.1 X |
| 3,848,428 | 11/1974 | Reiter, Jr. | 62/285 |
| 3,885,398 | 5/1975 | Dawkins | 62/89 |
| 3,984,224 | 10/1976 | Dawkins | 62/89 |
| 4,043,143 | 8/1977 | Fluder et al. | 62/243 |
| 4,098,093 | 7/1978 | Czyl | 62/244 X |
| 4,144,719 | 3/1979 | Williams et al. | 62/244 X |
| 4,201,064 | 5/1980 | Krug et al. | 62/239 |
| 4,217,764 | 8/1980 | Armbruster | 62/244 |
| 4,473,109 | 9/1984 | Kojima et al. | 165/12 |
| 4,549,406 | 10/1985 | Ebner et al. | 62/241 |
| 4,551,986 | 11/1985 | Anderson et al. | 62/244 |
| 4,592,207 | 6/1986 | Rummel | 62/244 |
| 4,607,497 | 8/1986 | Ferdows et al. | 62/DIG. 16 |
| 4,608,834 | 9/1986 | Rummel | 62/244 |
| 4,622,831 | 11/1986 | Grupa | 62/244 |
| 4,628,702 | 12/1986 | Boxum | 62/DIG. 16 |
| 4,641,502 | 2/1987 | Aldrich et al. | 62/244 |

Primary Examiner—William E. Tapolcai
Attorney, Agent, or Firm—D. R. Lackey

[57] ABSTRACT

A bus air conditioning unit suitable for roof mounting adjacent to the rear of a bus which includes an elongated support frame having first and second ends, front and rear portions, and a substantially open top portion. The elongated support frame is divided into forward and rear evaporator and condenser plenums, respectively, with reference to the front and rear of an associated bus, by an upstanding wall portion which extends between the first and second ends of the frame. The upstanding wall portion rises generally vertically for a predetermined dimension and it then slopes towards the front portion of the frame as it continues to rise, such that the condenser plenum includes the top portion of the frame. A condenser is supported by the substantially open top portion of the frame, an evaporator is mounted in the evaporator plenum across the front of the frame, and air conditioning system components are mounted in both said condenser and evaporator plenums. The air conditioning system components are all serviceable from the outside rear of the bus via openings provided in the rear portion of the frame, and via covered across openings provided in the upstanding wall portion which are accessible through the openings in the rear of the frame.

7 Claims, 8 Drawing Sheets

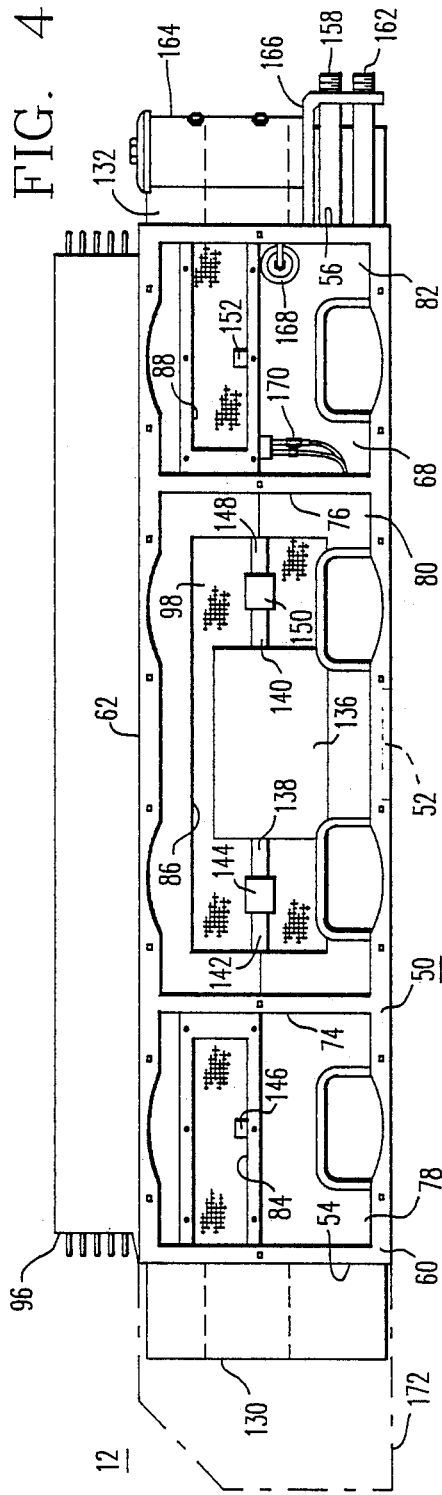

BUS AIR CONDITIONING UNIT

BACKGROUND OF THE INVENTION

1. Field of the Invention

The invention relates in general to air conditioning units, and more specifically to air conditioning units suitable for mounting on the top of a bus.

2. Description of the Prior Art

Air conditioning units for buses have many conflicting requirements concerning appearance, space required, and serviceability. For example, the air conditioning unit should have a low profile which smoothly blends with the profile of the bus, which essentially means that it must all substantially fit within the general outline of the bus. This requirement often conflicts with the desires of the bus company that the air conditioning unit must not take space that could be occupied by passengers and/or baggage. While the air conditioning unit desirably must fit within the outline of the bus and not occupy space otherwise suited by passengers and baggage, it is also a requirement that the air conditioning unit must be easily serviced from outside the bus. Finally, the location of the air conditioning unit must provide proper air flow paths for adequate ambient cooling air flow through the condenser, and proper air flow paths for returning bus air to the unit and discharging conditioned air back into air distributing bulkheads of the bus, without objectionable noise being generated in the passenger compartment of the bus.

SUMMARY OF THE INVENTION

Briefly, the present invention is a new and improved bus air conditioning unit which uniquely blends the prior art requirements into a compact, low profile air conditioning unit which requires only a small cavity at the top rear of a bus. A pivotally mounted main cover or shroud smoothly blends into the bus profile by providing a horizontally oriented condenser air inlet across the top of the air conditioning unit while simultaneously protecting the elements of the air conditioning unit from the weather. The cover or shroud further includes a depending portion which blends with the rear profile of the bus, with the depending portion including a hinged, louvered access panel which defines an air outlet for heated condenser air, and which provides access to the air conditioning unit for servicing without the necessity of pivoting the main cover from its operative position.

The air conditioning unit includes a single, elongated support frame having a base, first and second ends, front and rear portions, with respect to the front and rear of an associated bus, and a substantially open top portion. The first and second ends and front and rear portions all define air flow openings. An upstanding wall portion extends between the first and second ends, dividing the frame into evaporator and plenum chambers arranged front to rear, respectively. The upstanding wall portion rises from the base substantially vertically for a predetermined dimension and it then slopes towards the front portion of the frame as it continues to rise, such that the top portion of the frame forms part of the condenser plenum. A condenser coil is mounted on the top the frame, and an evaporator coil is mounted in the evaporator plenum, across the front of the frame.

First and second evaporator blowers are mounted at the first and second ends of the frame, respectively, in air flow communication with the openings defined by the first and second ends. A single motor mounted in the evaporator plenum drives the first and second evaporator blowers. The evaporator blowers draw air from the associated bus through the front portion of the frame and through the evaporator coil, and the conditioned air in the evaporator plenum is discharged into appropriate air distributing ducts along each side of the bus, above the passenger level.

Axial flow condenser fans and associated motors are mounted in the condenser plenum, across the back portion of the frame. Ambient cooling air is drawn through the condenser coil and into the condenser plenum, and heated air in the condenser plenum is discharged from the rear plane of the bus without generating disturbing noise within the passenger compartment of the bus.

Air conditioning system components are mounted at each end of the frame between the evaporator blowers and the rear plane of the frame, and in both the condenser and evaporator plenums. All of the air conditioning system components are serviceable via the pivotally mounted louvered access panel supported by the main cover, via the openings defined by the rear portion of the frame, and by covered access openings in the upstanding wall portion, which covers are also accessible via the openings defined by the rear portion of the frame.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 4 is a rear elevational view of the bus air conditioning unit shown in FIGS. 1-3, with all access covers removed, and with the condenser fans and motors removed, to illustrate the easy access to all air condtioning system components;

FIG. 5 is a rear elevational view similar to FIG. 4, except with the condenser fans and motors in position, and a removable shroud fastened to the rear of a main support frame;

DESCRIPTION OF PREFERRED EMBODIMENTS

Figure 1:
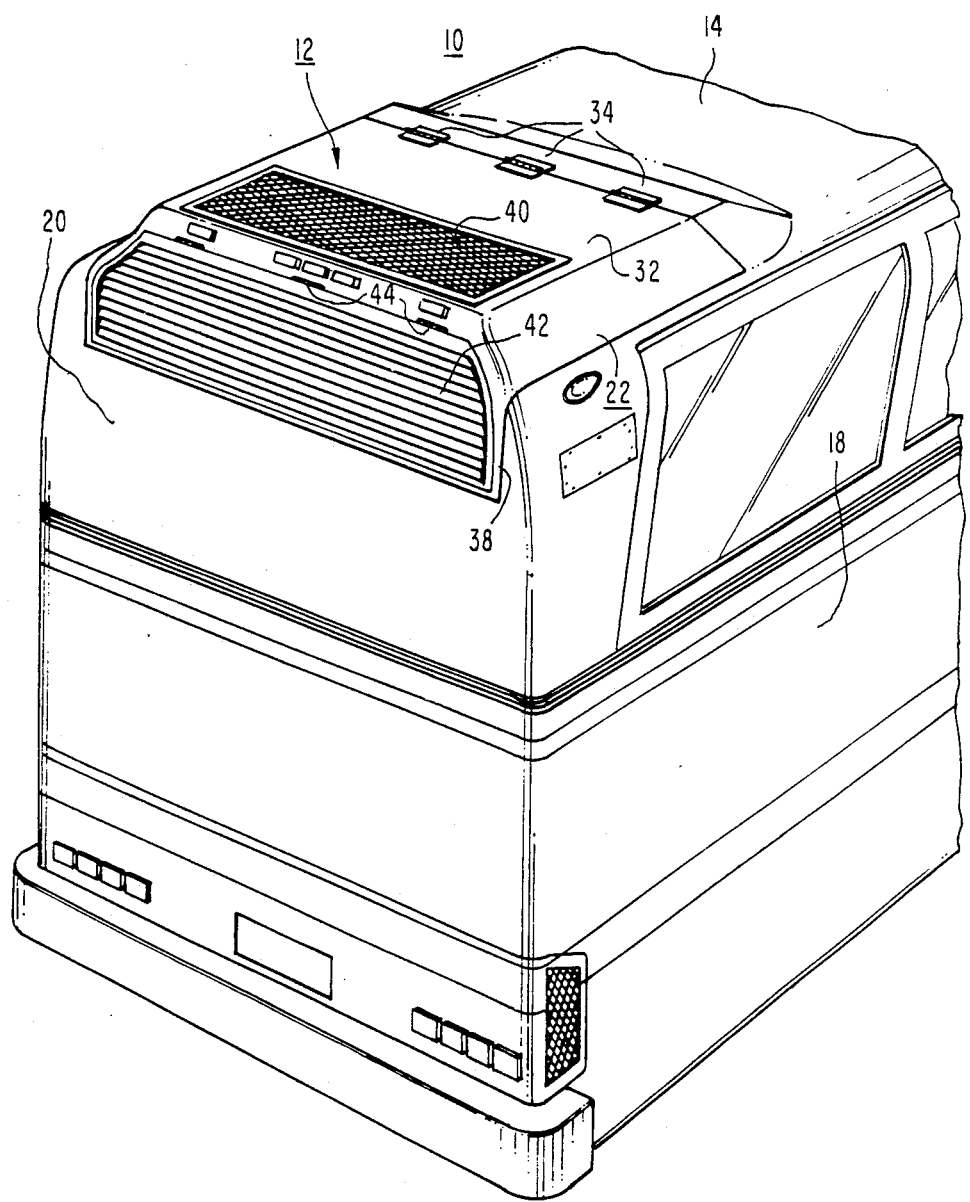
FIG. 1 is a perspective view of the rear of a bus, illustrating the smoothly blended profile of a shroud covered, roof mounted bus air conditioning unit constructed according to the teachings of the invention.
Figure 2:
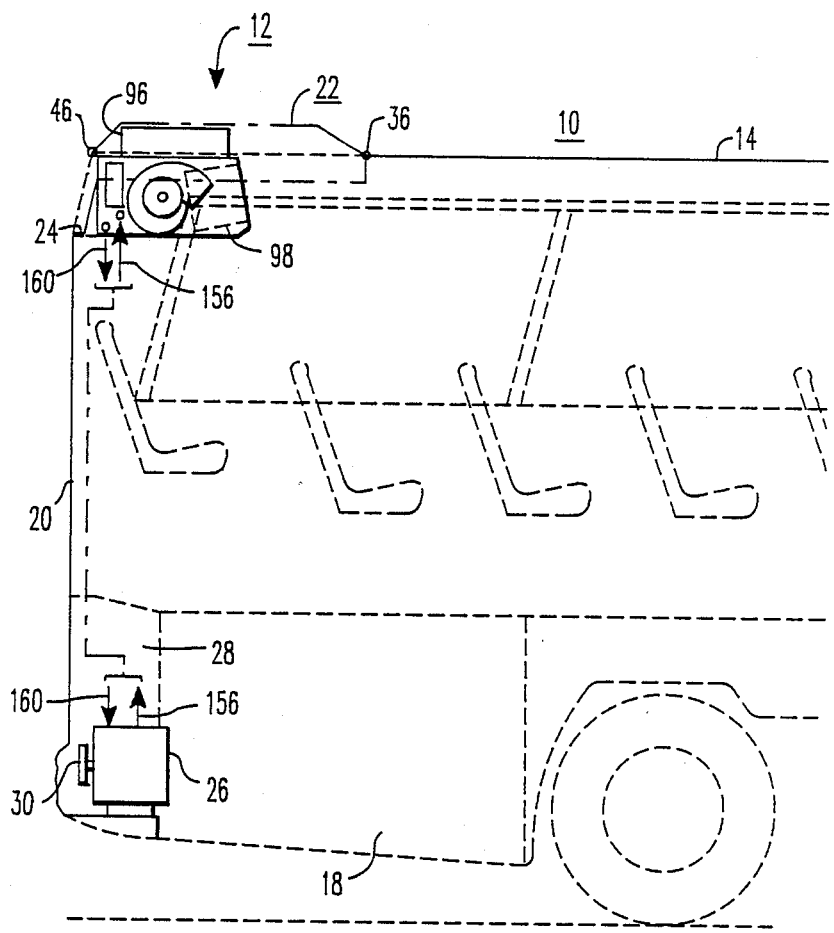
FIG. 2 is a side elevational view of the bus shown in FIG. 1, with the bus shown in phantom and the air conditioning components in solid.
Figure 3:
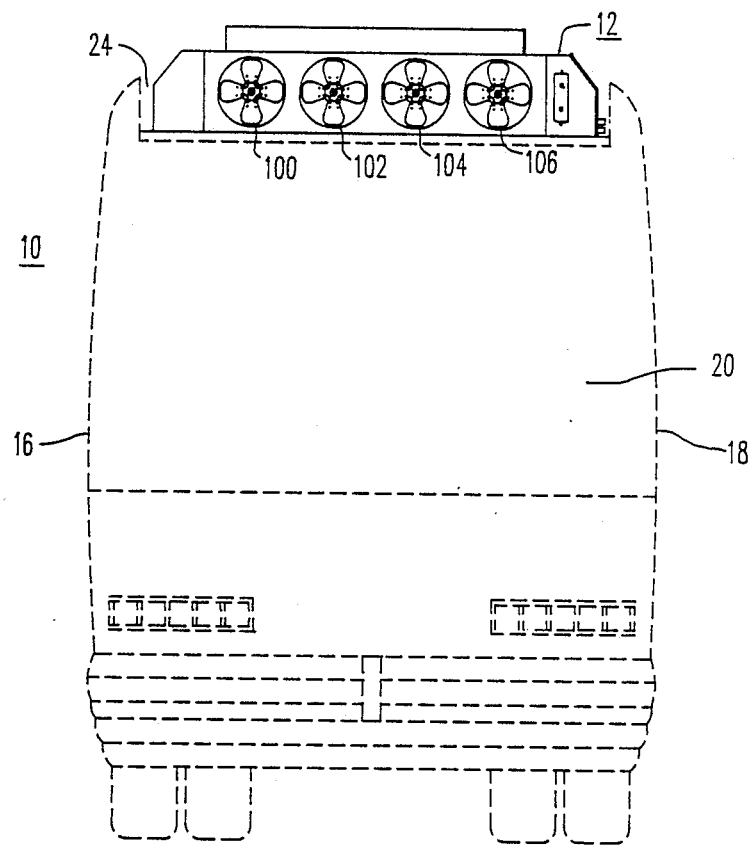
FIG. 3 is a rear elevational view of the bus shown in FIGS. 1 and 2, with the shroud removed to illustrate the rear air discharge plane of an air conditioning unit constructed according to the teachings of the invention.
Figure 6:
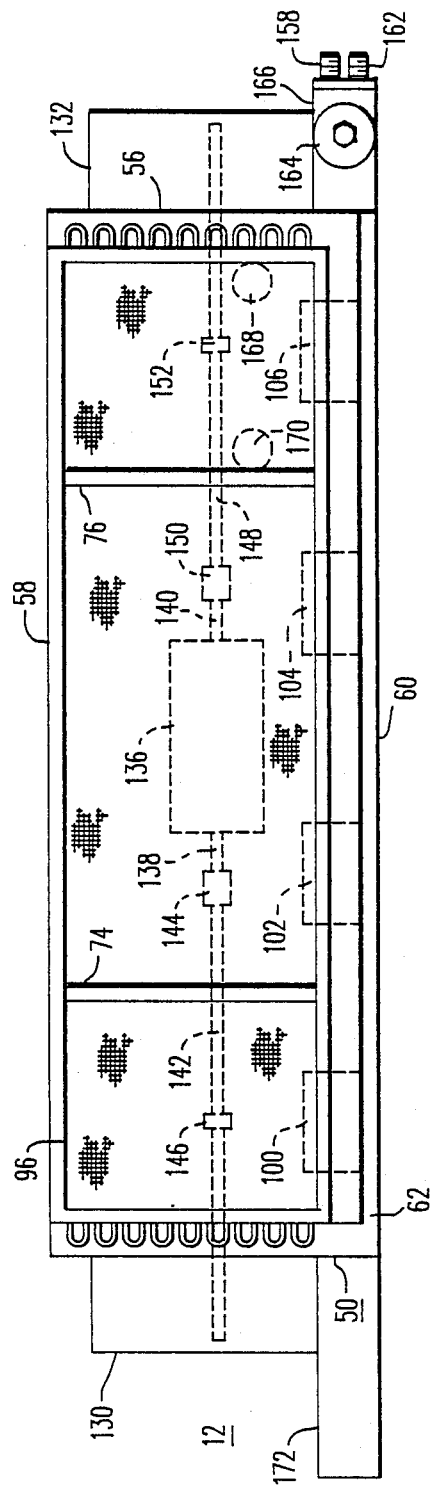
FIG. 6 is a top plan view of the bus air conditioning unit shown in FIG. 4.
Figure 7:
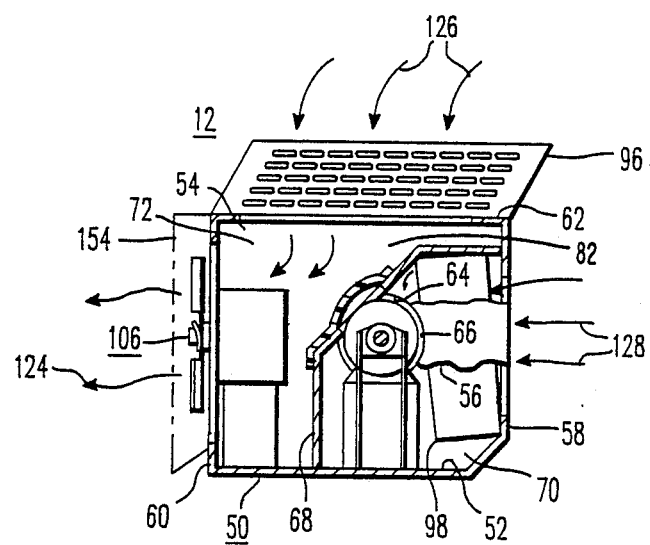
FIG. 7 is a right hand end view of the bus air conditioning unit shown in FIG. 5, taken between and in the direction of arrows VII—VII in FIG. 5.
Figure 8:
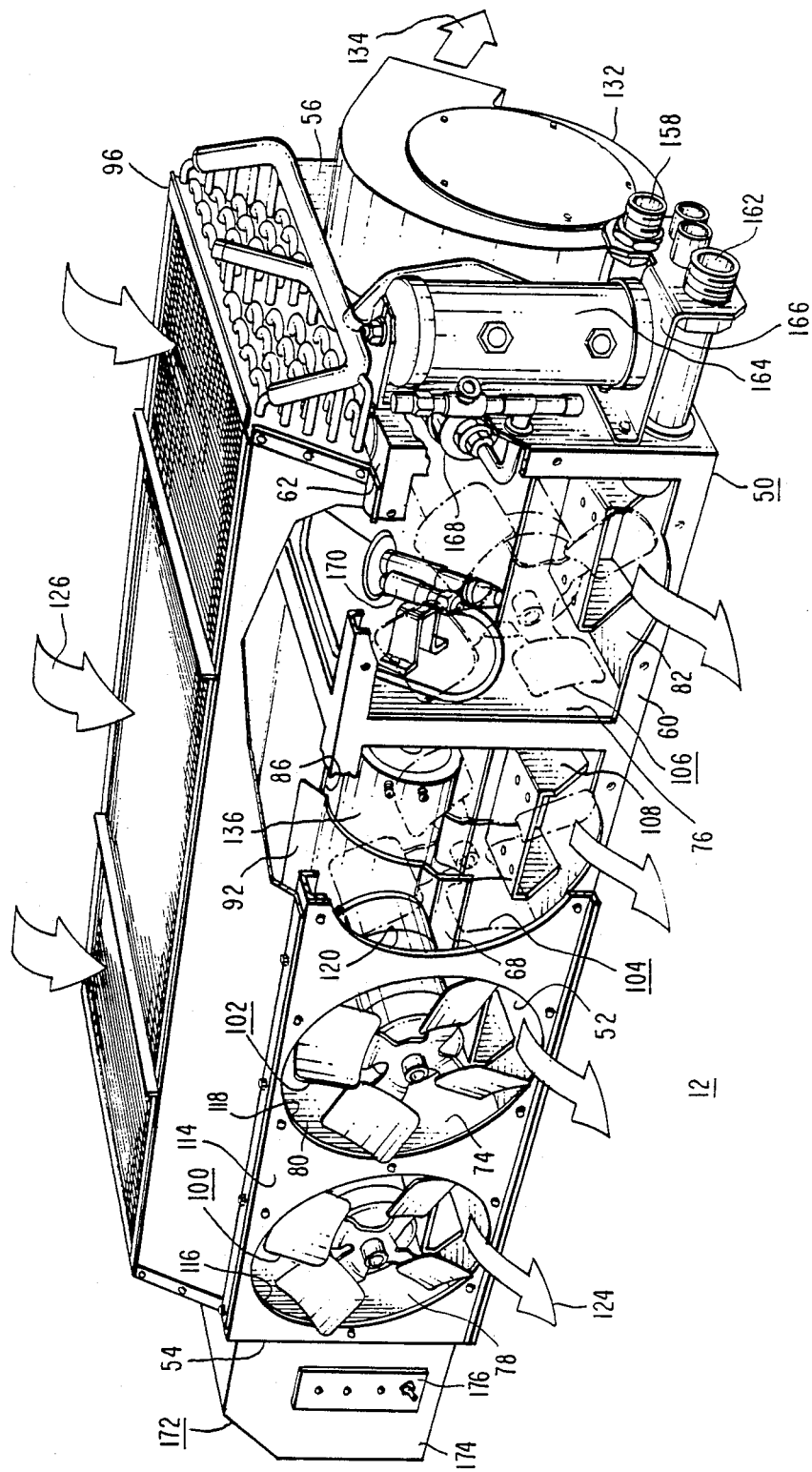
FIG. 8 is a rear perspective view, with parts cut away, of the bus air conditioning unit shown in FIGS. 4-7.
Figure 9:
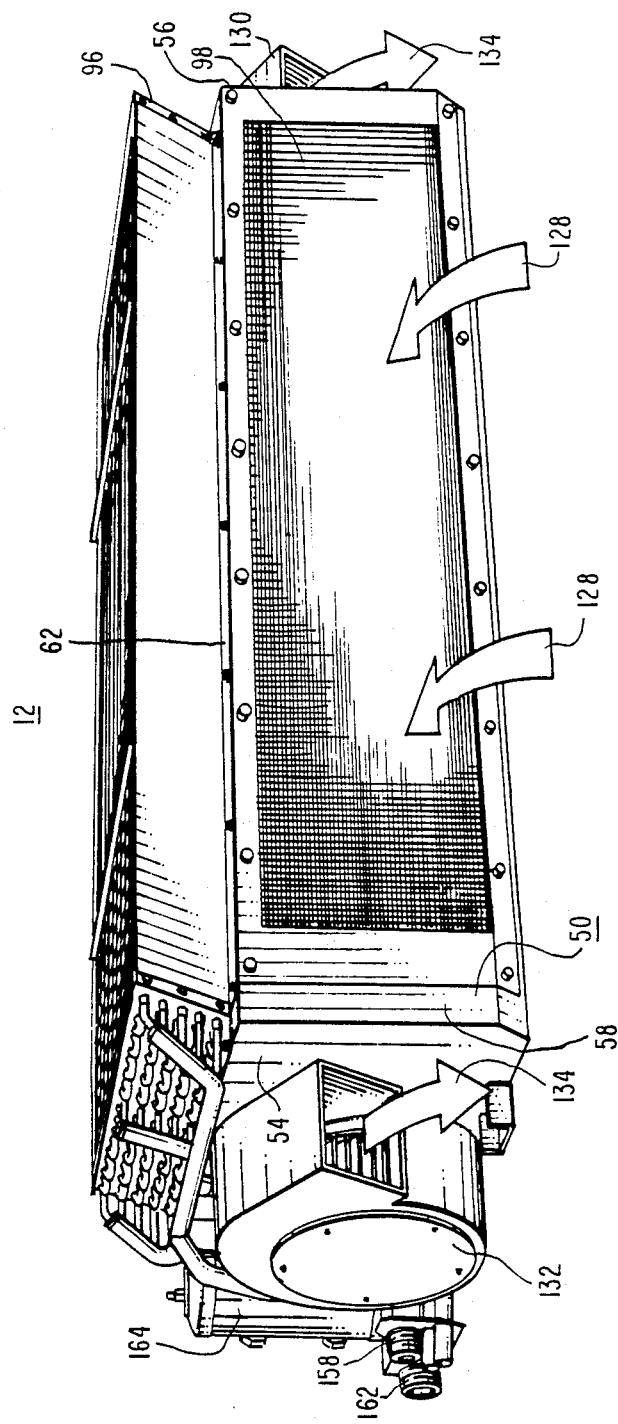
FIG. 9 is a front perspective view of the bus air conditioning unit shown in FIG. 8.

Referring now to the drawings, and to FIGS. 1, 2 and 3 in particular, there is shown a bus 10 having a roof top air conditioning unit 12 constructed according to the teachings of the invention. Bus 10 includes a top 14, sides 16 and 18, and a rear 20. Air conditioning unit 12 is a very low profile unit having a main cover or shroud 22 which smoothly blends with the bus profile, rising only very slightly at the location of the air conditiong unit 12 as it is approached in a direction from the front (not shown) to the rear 20 of the bus 10. A cavity 24 is provided in top 14, where rear 20 intersects top 14, with all components of the bus air conditioning unit 12 being located in cavity 24 except for a refrigerant compressor 26 which is located in a bus engine compartment 28. Compressor 26 is driven by a bus engine (not shown), such as via a belt and pulley arrangement 30.

Cavity 24 and air conditioning unit 12 are covered by cover 22 when cover 22 is in its normal operating position. Cover 22 includes a first portion 32 which is pivotally mounted to top 14 via hinges 34 having a pivot axis 36 shown in FIG. 2, and a depending second portion 38. The first portion 32, which is horizontally oriented when cover 22 is closed, includes a grill 40 for admitting ambient air for cooling purposes, as will be hereinafter explained.

The depending second portion 38 of cover 22, which is substantially vertically oriented when cover 22 is closed, includes an opening which is normally covered by a pivotally mounted louvered access panel or cover 42. After the ambient air which enters grill 40 is heated, it is discharged through the louvered access panel 42. Access panel 42 is connected to cover 22 via hinges 44 having a pivot axis 46 shown in FIG. 2. The air conditioning unit 12 is constructed such that all of the air conditioning system components which normally require service can be serviced through the access panel 42, without the necessity of pivoting cover 22 from its closed position.

Referring now to FIGS. 4 through 7, bus air conditioning unit 12 includes a metallic support frame 50 having a base 52, first and second end portions 54 and 56, respectively, front and rear portions 58 and 60, respectively, and a substantially open top portion 62. In addition to the substantially open top portion, the front and rear portions 58 and 60 of frame 50 are also substantially open. The first and second end portions 54 and 56 each include relatively large openings 64 and 66, respectively.

Frame 50 further includes an upstanding wall portion 68 which extends between the first and second ends 54 and 56 to divide frame 50 into front and rear chambers 70 and 72 which function as evaporator and condenser plenums, respectively. Upstanding wall portion 68 rises substantially vertically from base 52 for a predetermined dimension and it then slopes towards front 58 while continuing to rise, such that the substantially open top portion 62 is part of the condenser plenum 72. A pair of upstanding stiffening panel members 74 and 76 are provided in the condenser plenum 72 which are transverse to the upstanding wall portion 68, extending from the rear 60 to the top 62, as well as to a small upper portion of the front 58. Thus, the stiffening panel members 74 and 76 form first, second and third chambers 78, 80 and 82 in the condenser plenum 72.

Upstanding wall portion 68 includes access openings 84, 86 and 88 in chambers 78, 80 and 82, respectively, best shown in FIG. 4. Access openings 84, 86 and 88 have covers 90, 92 and 94, respectively, disposed thereon, best shown in FIG. 5, with covers 90, 92 and 94 being removable by access which is gained via the relatively large openings defined by the rear 60 of frame 50.

A condenser coil 96 is supported by the substantially open top 62 of frame 50, and by stiffening panels 74 and 76. Cooling air is moved through condenser coil 96 by axial flow fan assemblies 100, 102, 104 and 106, each of which include a motor and a fan blade. Fan 100 is disposed in the first chamber 78 of condenser plenum 72, fans 102 and 104 are disposed in the second chamber 80 of condenser plenum 72, and fan 106 is disposed in the third chamber 82 of condenser plenum 72. Each of the condenser fans are of similar construction. For example, condenser fan 104 includes a mounting base 108, an electric motor 110, and a fan blade 112. As shown in FIG. 5, a shroud 114 having openings 116, 118, 120 and 122 aligned with fans 100, 102, 104 and 106, respectively, is fixed to the rear 60 of frame 50. Fans 100, 102, 104 and 106 exhaust air from the condenser plenum 72, indicated by arrows 124, reducing the air pressure therein, causing ambient cooling air, indicated by arrows 126, to enter condenser plenum 72 through condenser coil 96, thus picking up heat from condenser coil 96. Fans, 100, 102, 104 and 106, being along the back plane of the bus 10, create very little noise in the bus itself, but yet are part of a simple but effective cooling air flow path.

An evaporator coil 98 is disposed in the evaporator plenum 70, along the substantially open front 58 of frame 50. Air from the passenger compartment of bus 10, indicated by arrows 128, is drawn into and moved through evaporator coil 98 by first and second centrifugal blowers 130 and 132, respectively, with blowers 130 and 132 returning conditioned air, indicated by arrows 134, to air distributing ducts (not shown) in bus 10.

Blowers 130 and 132 are mounted outside of frame 50, and thus outside evaporator plenum 70. Blowers 130 and 132 are suitable fastened to the first and second ends 54 and 56, respectively, of frame 50, in air flow communication with evaporator plenum 70 via openings 64 and 66. Blowers 130 and 132 exhaust air from the evaporator plenum 70, reducing the pressure therein, and causing air to be drawn into the evaporator plenum through the evaporator coil 98. It will be noted that the blowers 130 and 132, being outside of the evaporator plenum 70, will generate very little noise that will be injected into the passenger compartment, and being located at the very start of the air distributing ducts of the bus maximizes air delivery of conditoned air to the bus because there is little energy loss between the blowers and the air distributing ducts.

In a preferred embodiment of the invention, blowers 130 and 132 are driven by a single electric motor 136 having output shafts 138 and 140 at opposite axial ends. Motor 136 is preferably centrally located within evaporator plenum 70, with shaft 138 driving blower 130 via an auxiliary shaft 142 and coupling 144. An outboard bearing 146 is located between blower 130 and coupling 144 to support auxiliary shaft 142. In like manner, shaft 140 drives blower 132 via an auxiliary shaft 148, coupling 150 and an outboard bearing 152. It will be noted in FIG. 4 that motor 136 and its associated auxiliary shafts, couplings, and bearings, are all readily accessible for service and/or replacement via the large openings at the rear 60 of frame 50 and via the openings 84, 86 and 88 in the upstanding wall portion 68. The remaining components of bus air conditioning unit 12 are all mounted so that they may be serviced and replaced if necessary by access from the rear of bus 10, by lifting louvered panel 42, removing a protective grill 154 shown in phantom in Figure 7, removing shroud 114, if necessary, and removing one or more condenser fan assemblies, if necessary. Hot gas discharge line from compressor 26, indicated by arrows 156, is connected to a fitting 158 attached to the second end 56 of frame 50, and, in like manner, the suction line which returns refrigerant to compressor 26, indicated by arrows 160, is connected to a fitting 162 adjacent to fitting 158. A receiver 164 for receiving refrigerant from condenser coil 96 is also disposed at end 56, with a mounting bracket 166 supporting receiver 164 as well as fittings 158 and 162. A drier 168 and expansion valve 170 may be mounted in the third chamber 82 of the condenser plenum 72. An electrical control panel 172 is mounted adjacent to the first end 54 of frame 50, between blower 130 and the back plane of the rear 60 of frame 50. Control panel 172 includes all of the electronic controls for automatically maintaining the proper temperature inside bus 10. The control components inside panel 172 are serviceable from the rear of bus 10 via a hinged access door 174 which includes a switch and indicator panel 176 on its outer To service the bus air conditioning unit 12 the louvered access panel 42 is lifted. This will give immediate access to the control panel 172, receiver 164, and the suction and high pressure gas fittings 162 and 158. Removing protective grill 154 and shroud 114 provides access to fans 100, 102, 104, and 106, drier 168 and expansion valve 170. Removing fan 100 and cover 90 provides access to outboard bearing 146. Removing fan assemblies 102 and 104 and cover 92 provides access to blower motor 136, couplings 144 and 150, and speed resistors (not shown). Removing fan, assembly 106 and cover 94 provides access to outboard bearing 152. Thus, all of the air conditioning components which require periodic inspection, maintenance, and/or replacement are readily accessible from the outside rear of the bus 10. Pivoting the main cover 22 from its closed position provides access to the complete unit 12.

In summary, there has been disclosed a new roof mounted bus air condeitioning unit which is easily serviced from the outside rear of a bus. The new bus air conditioning unit has a low profile, requiring only a smooth upward flair across the unit from the bus top towards the rear of the bus, which smoothly blends with the bus profile. The bus air conditioning unit occupies a very small volume at the upper rear of the bus which is not suitable for passengers or baggage. The condenser fans are located on the back plane of the bus for both air flow efficiency and minimum noise in the passenger compartment. The evaporator blowers are located outside the evaporator plenum, also for minimum noise and for maximizing the availability of conditioned air in the passenger compartment.

I claim as my invention:

1. A bus air conditioning unit suitable for roof mounting adjacent to the rear of a bus, comprising:
   an elongated support frame having a base, first and second ends each defining openings, front and rear portions each defining openings, with the rear portion adapted for mounting in general alignment with the rear of a bus, and a substantially open top portion,
   an upstanding wall portion on said base which extends between said first and second ends, dividing said frame from front to rear into first and second chambers, respectively, which respectively function as evaporator and condenser plenums,
   said upstanding wall portion rising substantially vertically from said base for a predetermined dimension and then sloping toward said front portion as it continues to rise, such that the condenser plenum includes said open top portion,
   a condenser supported by the substantially open top portion of said frame,
   an evaporator in the evaporator plenum, adjacent to the front of said frame,
   and air conditioning system components mounted on said frame in both said evaporator and condenser plenums,
   said upstanding wall portion defining access openings therein and including removable covers on said access openings, with said removable covers being accessible via the openings in the rear portion of said frame,
   whereby said air conditioning system components are serviceable from the outside rear of a bus, through the openings defined by the rear portion of said frame, and through the covered access openings defined by said upstanding wall portion.

2. The bus air conditioning unit of claim 1 including first and second evaporator blowers mounted on the first and second ends, respectively, of the frame, in air flow communication with the openings defined by the first and second ends, and wherein the air conditoning system components include a single electrical motor mounted in the evaporator plenum for driving said first and second evaporator blowers, said first and second evaporator blowers drawing air into the evaporator plenum via the opening defined by the front of the frame and through the evaporator, and exhausting the air in the evaporator plenum through the openings defined by the first and second ends of the frame.

3. The bus air conditioning unit of claim 2 wherein the single electrical motor has first and second shafts, first and second auxiliary shafts coupled to said first and second motor shafts, respectively, and first and second bearing means for respectively supporting said first and second auxiliary shafts, with said first and second auxiliary shafts operatively engaging said first and second evaporator blowers.

4. The bus air conditioning unit of claim 1 wherein the air conditioning system components include a plurality of condenser fans mounted in the condenser plenum each driven by a separate electrical motor, with said condenser fans drawing ambient air through the condenser and into the condenser plenum via the substantially open top, and exhausting the air in the condenser plenum through the openings defined by the rear portion of the frame.

5. The bus air conditioning unit of claim 1 wherein the air conditioning system components include a drier and an expansion valve mounted in the condenser plenum, and further including a receiver supported by the frame adjacent to one of the first and second ends, adjacent to the rear portion of the frame.

6. The bus air conditioning unit of claim 1 including electrical controls supported by said frame adjacent to one of the first and second ends, and adjacent to the rear portion of the frame.

7. The bus air conditioning unit of claim 1 including a cover having an operative position which provides a low profile protective shroud about the frame, said cover having a first portion adapted for pivotable attachment to the top portion of a bus, and a depending second portion, said first portion extending across the top portion of the frame and condenser, with said first portion including an air entry grill for the condenser, said second portion extending downwardly across the rear portion of the frame, said cover including a hinged, louvered access panel in the depending second portion which defines an air outlet for air in the condenser plenum while providing access to the rear portion of the frame for servicing the air conditioning system components, without the necessity of pivoting the cover from its operative position.

* * * * *